United States Patent [19]

Bazilevich et al.

[11] 4,162,107
[45] Jul. 24, 1979

[54] BRAKING SYSTEM FOR A RAILWAY CAR

[75] Inventors: Gennady S. Bazilevich, Zheleznogorsk Kurskoi oblasti; Alexandr F. Gorin, Kremenchug Poltavskoi oblasti; Vladimir N. Lozinsky, Zheleznogorsk Kurskoi oblasti; Vladimir I. Lysenko, Kaliningrad; Vladimir M. Nosach, Poltavskaya oblast, Kremenchugsky raion, selo Kameno-Potoki; Grigory I. Solod, Moscow; Yakov M. Sterinzat, Kremenchug Poltavskoi oblasti, all of U.S.S.R.

[73] Assignee: Vsesojuzny Nauchno-Issledovatelsky Proektno-Tekhnologichesky Institut Vagonostroenia, U.S.S.R.

[21] Appl. No.: 873,689

[22] Filed: Jan. 30, 1978

[51] Int. Cl.² .............................................. B60T 13/74
[52] U.S. Cl. ......................................... 303/3; 303/15; 303/30
[58] Field of Search ................... 303/3, 15, 28, 29, 30, 303/40, 64, 66

[56] References Cited
U.S. PATENT DOCUMENTS 4,052,109 10/1977 Nagase ..................................... 303/3

Primary Examiner—Trygve M. Blix
Assistant Examiner—Reinhard J. Eisenzopf
Attorney, Agent, or Firm—Fleit & Jacobson

[57] ABSTRACT

A braking system for a railway car in which a brake cylinder communicates with a compressed air line and atmosphere via a valve mechanism controlled by a pneumatic air distributor and an electropneumatic valve which communicate with the compressed air line. The valve mechanism communicates with the compressed air line via an auxiliary receiver and has two interconnected diaphragms of different areas spaced apart from each other. The diaphragms are also connected to the movable member of the valve mechanism during application of brakes and form chambers with the casing thereof, of which one chamber, which is defined by the greater diaphragm, communicates with the pneumatic air distributor, and the other chamber, which is defined by the smaller diaphragm, communicates with the electropneumatic valve connected to the auxiliary receiver. This construction of the braking system ensures reliable braking of both empty and loaded train.

1 Claim, 1 Drawing Figure

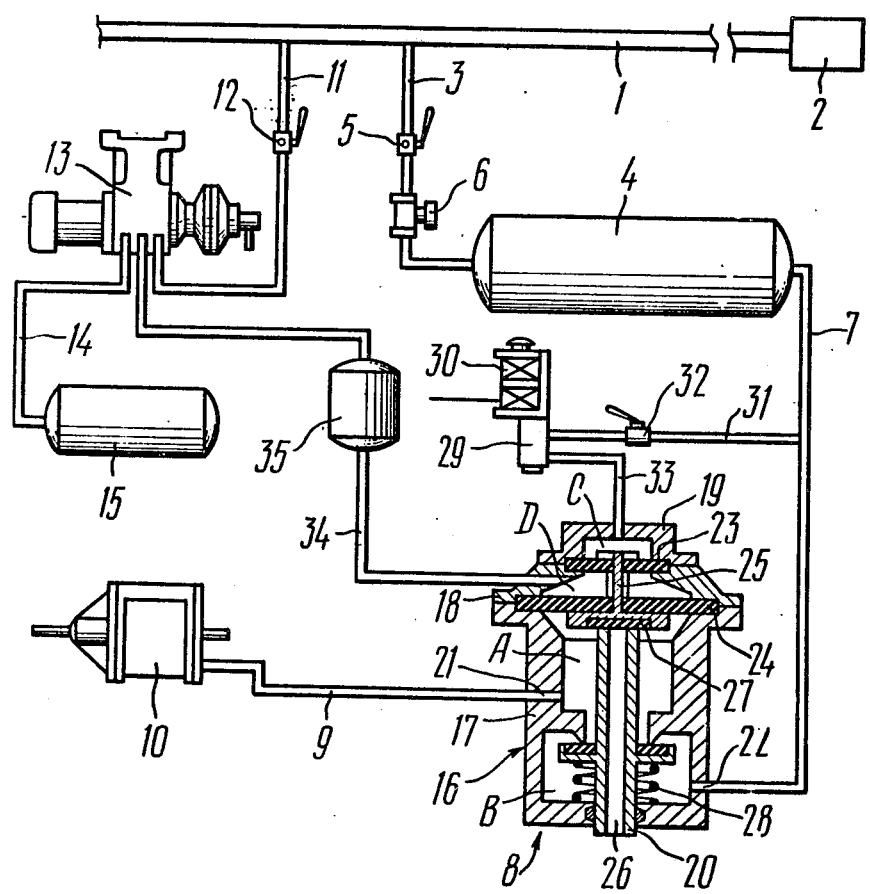

BRAKING SYSTEM FOR A RAILWAY CAR

The invention relates to the railway transport, and more particularly, to braking systems of railway cars.

The braking system according to the invention may be most advantageously used in cars operating on quarry railways with gradient up to 60°/oo inclusively.

Known in the art are braking systems for railway cars comprising an air line connected to a source of compressed air which will be referred to as compressed air line, a brake cylinder communicated with the air line via a valve means and a pneumatic air distributor having a compressed air receiver. The valve means is controlled during the braking of the train by the pneumatic air distributor, and during the stop braking of the train by an electropneumatic braking valve which is connected to the compressed air receiver via a shut-off valve and a pressure reducer. Another electropneumatic release valve is used for communicating the brake cylinder with atmosphere, which is electrically interlocked with the electropneumatic brake valve.

In known braking systems, the brake cylinder is connected to the compressed air line via a valve means and a pneumatic air distributor, and the control of the valve means is carried out selectively by means of a pneumatic air distributor and electropneumatic valve. This connection of the brake cylinder with the air line results in exhaustion of reserve of compressed air in the receiver during frequent brakings, that is there is no time for refilling with air from the air line because a pneumatic air distributor has passages of comparatively small section. Passages connecting the electropneumatic valve to the compressed air receiver have large cross-sectional area. The pressure reducer mounted between the electropneumatic brake valve and the compressed air receiver is adjusted for a pre-set constant pressure so that braking forces for empty and loaded train (interconnected cars without a locomotive) are identical. Thus, in braking an empty train, it would slide thus inevitably resulting in rapid wear of wheel pairs. When a loaded train is braked with the same force, a required braking efficiency cannot be provided thus making it possible for an emergency situation to occur.

It is an object of the invention to provide a braking system for a railway car in which the valve means and its connection to the compressed air line ensure reliable braking of both empty and loaded trains.

Another object of the invention is to prolong the service life of wheel pairs.

In accordance with the above and other objects, it is contemplated a braking system for a railway car in which a brake cylinder communicates with a compressed air line and atmosphere via a valve means which is controlled by a pneumatic air distributor and an electropneumatic valve which communicate with the compressed air line, which, according to the invention, is provided with an auxiliary receiver communicating with the compressed air line, the valve means communicates with the compressed air line via the auxiliary receiver and has two permanently interconnected spaced diaphragms of different areas connected to a movable member of the valve means during the braking and defining with the casing chambers, of which one, which is defined by the greater diaphragm, communicates with the pneumatic air distributor and the other, which is defined by the smaller diaphragm, communicates with the electropneumatic valve which communicates with the compressed air line via the auxiliary receiver.

The braking system for a railway car accomplished according to the present invention provides for reliable braking of both empty and loaded trains on steep gradient railways of up to 60°/oo inclusively.

The invention will now be described with reference to a specific embodiment illustrated in the accompanying drawing which diagrammatically shows the braking system for a railway car with the valve means in longitudinal section.

The braking system for a car comprises a compressed air line 1 connected to a source of compressed air 2.

The compressed air line 1 is connected by means of a pipeline 3 to an auxiliary receiver 4. A shut-off valve 5 and a check valve 6 are mounted on the pipeline 3. The auxiliary receiver 4 is connected by means of a pipeline 7 to the inlet of a valve means 8. The outlet of the valve means 8 is connected to a pipeline 9 communicating a chamber "A" of the valve means 8 with the chamber of a brake cylinder 10. A pipeline 11 connects, via a shut-off valve 12, a pneumatic air distributor 13 to the compressed air line 1. The air distributor 13 is connected, via a pipeline 14, to a receiver 15.

The valve means 8 comprises a casing 16 consisting of three interconnected parts 17, 18 and 19. The casing 16 accommodates a movable member 20 separating the chambers "A" and "B" from each other, that is separating an outlet opening 21 from the inlet opening 22. The valve means 8 accommodates spaced diaphragms 23 and 24 defining two chambers "C" and "D", respectively, within the casing 16. The diaphragm 23 is of a smaller area subjected to pressure than the diaphragm 24. The diaphragms 23 and 24 are rigidly interconnected by means of a link 25.

The diaphragm 24 is tightly clamped between the parts 17 and 18 of the casing 16 and sealingly separates the chamber "A" from the chamber "D". The diaphragm 23 is rigidly clamped between the parts 18 and 19 sealingly separates the chamber "D" from chamber "C". Both diaphragms 23 and 24 are made of an elastic material, and in this embodiment rubber is used for the diaphragms, which withstands temperature fluctuations between minus 60° C. and plus 50° C.

The movable member 20 is made with a through passage 26 for connecting the chamber "A" to atmosphere during normal running of the train, that is without application of brakes.

The link 25 incorporates, in the side facing the movable member 20, a rubber gasket 27 which tightly seals-off the passage 26 during braking. The movable member 20 is permanently urged against the rubber gasket 27 by means of a spring 28 so as to define, with the diaphragms 23, 24 and the link 25, an integral unit for combined movement during application of brakes.

The movement of the movable member 20 is controlled by an electropneumatic valve 29 having its electromagnetic coils 30 which are constantly under a voltage of about 50 V. The electropneumatic valve 29 is connected to the pipeline 7 by means of a pipeline 31 and a shut-off valve 32.

For controlling the movement of the movable member 20, the chamber "C" of the valve means 8 is connected by means of a pipeline 33 to the electropneumatic valve 29, and the chamber "D" is connected to the pneumatic air distributor 13 via a pipeline 34 and an auxiliary receiver 35. The auxiliary receiver 35 provides uniform supply of the chamber "D" with compressed air so that smooth application of brakes may be effected when the train runs down a long descent.

The braking system for a railway car functions in the following manner.

During normal running of the train, the receiver 15 is in permanent communication with the compressed air line 1 through the pneumatic air distributor 13 and the pipelines 14 and 11. The shut-off valve 12 is open. The movement of the movable member 20 of the valve means 8 is controlled by the pneumatic air distributor 13.

At the same time, the auxiliary receiver 4 and the pipelines 7 and 31 are permanently refilled with compressed air to the pressure of 6.5 kgf/cm² from the source of compressed air 2 through the compressed air line 1 and the pipeline 3, via the shut-off valve 5, which is in the working position, and the check valve 6. The shut-off valve 32 is permanently open to communicate the chamber of the electropneumatic valve 29 with the pipeline 31. Compressed air is not fed to the pipeline 33 since an electric voltage is permanently applied to the coils 30 of the electropneumatic valve 29 so that the valve 29 shuts-off the communication of this pipeline with the chamber "C" of the valve means 8. The chamber "C" is connected, via a passage (not shown) of the electropneumatic valve 29, to atmosphere. The chamber "B" of the valve means 8 is permanently filled with compressed air through the inlet hole 22, and this air, together with the spring 28, holds the movable member 20 of the valve means 8 in the position in which it separates the chambers "B" and "A" from each other, that is hampers the penetration of air to the chamber of the brake cylinder 10.

Compressed air flows from the brake cylinder 10, via the pipeline 9 and the outlet openings 21, to the chamber "A" of the valve means 8. Due to the gauge pressure in this chamber, the diaphragms 24 and 23 are cambered up, and the chamber "A" of the valve means 8 communicates with atmosphere through the passage 26 of the movable member 20.

Application of brakes is effected in the following manner by means of the pneumatic air distributor 13. The chamber "C" of the valve means 8 is connected to atmosphere through a passage of the electropneumatic valve 29 as described above.

Upon pressure drop in the compressed air line 1, a tap (not shown) mounted in the locomotive is operated to connect, by means of the pneumatic air distributor 13, the receiver 15, via the pipelines 14 and 34 and the auxiliary receiver 35, to the chamber "D" of the valve means 8.

The pressure value in the chamber "D" is defined by the amount of discharge, that is pressure drop in the air line 1 and on the ratio of areas of the diaphragms 23 and 24. Under the action of the resultant force applied to the greater diaphragm 24 and smaller diaphragm 23, the diaphragms camber down so as to shut-off the through passage 26 of the movable member 20 of the valve means 8. Further movement of the diaphragms 23 and 24 occurs together with the movable member 20 as an integral unit. Acting to overcome the force of the spring 28, the movable member 20 moves down to establish communication of the chamber "B" with the chamber "A", whereby the brake cylinder 10 is filled with compressed air.

When the force acting on the greater diaphragm 24 on the side of the chamber "A" becomes equal to the resultant force acting on the side of the chamber "D", the movable member 20 moves up under the action of the spring 28 to disconnect the chambers "A" and "B". Thus the auxiliary receiver 4 is disconnected from the brake cylinder 10. The pressure in the chamber of the brake cylinder 10 becomes constant thus providing for stoppage of the train with empty cars as well as for driving a loaded train at pre-set speeds on given track sides.

Application of brakes by means of the electropneumatic valve 29 is effected as follows. When voltage is removed from the coils 30 of the electropneumatic valve 29, the communication of the chamber "C" with atmosphere, via the pipeline 33 and the electropneumatic valve 29, is interrupted The chamber "C" is connected, via the pipeline 33, electropneumatic valve 29 and the pipelines 31 and 7 and the shut-off valve 32, to the auxiliary receiver 4. In this case, the tap in the locomotive is in the position as mentioned above, that is, as for normal running of the train.

Under the action of pressure of the compressed air fed from the auxiliary receiver 4, the diaphragm 23 cambers down to cause the displacement of the diaphragm 24 rigidly connected thereto in the same direction. The through passage 26 of the movable member 20 is shut-off. The communication of the brake cylinder 10 with atmosphere is interrupted. Further movement of the diaphragms 23 and 24 in combination with the movable member 20 overcomes the resistance of the spring 28 to establish communication of the auxiliary receiver 4 with the brake cylinder 10.

Compressed air flows from the auxiliary receiver 4 to the chamber "A" and urges the diaphragm 24 from the underside.

Once the values of forces under the lower diaphragm 24 and above the upper diaphragm 23 become equal, the communication of the chamber "B" with the chamber "A" in the valve means 8 is interrupted, that is the communication of the auxiliary receiver 4 with the brake cylinder 10 is interrupted. A pressure value of 1.8–2.2 kgf/cm² is obtained in the brake cylinder 10 thus ensuring the stoppage of the train in emergency situations, as well as stoppages for the production purposes, such as for example in wheeling cars to excavators for loading and the like. The time for filling and discharging the brake cylinder 10 does not exceed 1 s thus providing for sufficiently rapid stoppage of the train.

With unfavourable weather conditions (frost), ice may form on the friction surfaces between the wheel and the brake shoe. To eliminate the ice, application of brakes is effected by impulses, and for that purpose, the electrical circuit supplying the coils 30 of the electropneumatic valve 29 is broken several times so that a number of successive filling and discharging cycles of brake cylinder 10 occur.

This braking mode is only possible due to the fact that the brake cylinder 10 communicates with the auxiliary receiver 4 which is directly connected to the compressed air line 1 and is permanently refilled with air from the line, so that there is no "exhaustion" with frequent brake applications.

This method of brake application may be used also for uniform running of a loaded train through a track side with gradient of up to 60°/oo inclusively.

Application to brakes with combined action of the pneumatic air distributor 13 and the electropneumatic valve 29 is effected in the following manner.

Pressure in the compressed air line 1 is reduced, and the electrical circuit of the electropneumatic valve 29 is broken. Compressed air from the receiver 15 is admitted to the chamber "D", and the air from the pipeline 7 is admitted to the chamber "C" of the valve means 8.

Thus, the pneumatic air distributor 13 feeds compressed air to the chamber "D", and the electropneumatic valve 29 feeds air to the chamber "C" of the valve means.

Due to the total pressure in the chambers "D" and "C", the diaphragms 23 and 24 move down as an integral unit with the movable member 20 of the valve means 8 to establish communication of the auxiliary receiver 4 with the brake cylinder 10.

When the forces acting on the side of the chambers "C" and "D" and the chamber "A", respectively, become equal, that is upon complete filling of the chamber of the brake cylinder 10 with compressed air, the spring 28 overcomes the resistance of the resultant forces acting on the movable member 20 and lifts it to the upmost position as shown in FIG. 1, in which the chambers "A" and "B" are disconnected from each other, that is the communication of the auxiliary receiver 4 with the brake cylinder 10 is interrupted.

Thus, the value of pressure in the brake cylinder 10 is of the order of 4–4.2 kgf/cm$^2$ to ensure stoppage of a loaded train in any situation.

A prototype of a quarry train having cars equipped with the braking system according to the invention has been tested in quarries with gradient of tracks up to 60°/oo. Permissible starting speed for loaded train of 1900 tons and with a car axle load of 35 tons was 35 km/h. Braking distance did not exceed 300 m for both empty and loaded trains.

Maximum value of longitudinal forces in the train during application of brakes did not exceed 120 tons with the admissible value of 200 tons.

Temperature at the friction surfaces did not exceed 350°–400° C. which was within the limit of 600° C. with 20 successive applications of brakes.

What we claim is:

1. A braking system for a railway car comprising: a source of compressed air; a compressed air line connected to said source of compressed air; an auxiliary receiver connected to said compressed air line; a brake cylinder selectively communicating with said auxiliary receiver and atmosphere; a pneumatic air distributor communicating with said compressed air line; an electropneumatic valve connected to said auxiliary receiver; a valve means communicating with said pneumatic air distributor, with said electropneumatic valve, and with said auxiliary receiver for controlling the communication of said brake cylinder with the auxiliary receiver and atmosphere; said pneumatic air distributor and electropneumatic valve being adapted to control said valve means; said valve means comprising: a casing having an inlet and an outlet for compressed air, a movable member accommodated in said casing and adapted for disconnecting the inlet from the outlet of said casing, two diaphragms spaced apart from each other within said casing and interconnected for combined movement, said two diaphragms being of different surface areas, chambers defined by said diaphragms in said casing, one of said chambers defined in said casing by one of said diaphragms, which is of a smaller surface area, communicating with said electropneumatic valve, the other of said chambers defined in said casing by the other of said diaphragms, which is of a greater surface area, communicating with said pneumatic air distributor, said diaphragms being connectible with said movable member during application of brakes for combined movement; and means for communicating said valve means with atmosphere.

* * * * *